United States Patent
Heath

(10) Patent No.: US 9,369,517 B2
(45) Date of Patent: Jun. 14, 2016

(54) SYNCHRONIZED DATA CHANGES

(71) Applicant: INTERNATIONAL BUSINESS MACHINES CORPORATION, Armonk, NY (US)

(72) Inventor: David M. Heath, Evergreen, CO (US)

(73) Assignee: International Business Machines Corporation, Armonk, NY (US)

(*) Notice: Subject to any disclaimer, the term of this patent is extended or adjusted under 35 U.S.C. 154(b) by 187 days.

(21) Appl. No.: 13/781,971

(22) Filed: Mar. 1, 2013

(65) Prior Publication Data

US 2014/0250063 A1 Sep. 4, 2014

(51) Int. Cl.
| | |
|---|---|
| G06F 7/00 | (2006.01) |
| G06F 17/00 | (2006.01) |
| H04L 29/08 | (2006.01) |
| G06F 17/30 | (2006.01) |

(52) U.S. Cl.
CPC .......... *H04L 67/10* (2013.01); *G06F 17/30578* (2013.01)

(58) Field of Classification Search
CPC .............. G06F 17/28; G06F 17/30247; G06F 17/30557; G06F 17/30864
See application file for complete search history.

(56) References Cited

U.S. PATENT DOCUMENTS

| | | | | |
|---|---|---|---|---|
| 2007/0014314 A1* | 1/2007 | O'Neil | ................. | 370/503 |
| 2007/0094467 A1* | 4/2007 | Yamaski | .......... | G06F 11/2082 711/162 |
| 2010/0106684 A1* | 4/2010 | Pizzo | ................. | G06F 17/30581 707/610 |
| 2010/0295796 A1* | 11/2010 | Roberts | ................. | G06F 3/0412 345/173 |
| 2011/0010467 A1 | 1/2011 | Goyal et al. | | |
| 2011/0295796 A1* | 12/2011 | Muhunthan et al. | .......... | 707/610 |
| 2012/0117025 A1 | 5/2012 | Sagar et al. | | |
| 2012/0143819 A1 | 6/2012 | Tan | | |
| 2012/0210064 A1* | 8/2012 | Coronado et al. | ............. | 711/118 |
| 2013/0027556 A1* | 1/2013 | Clark | ................. | G08B 21/24 348/148 |

(Continued)

FOREIGN PATENT DOCUMENTS

| | | |
|---|---|---|
| EP | 1452978 A2 | 9/2004 |
| WO | 0101249 A1 | 1/2001 |
| WO | 2005004372 A2 | 1/2005 |

OTHER PUBLICATIONS

IBM, "A Peer to Peer Database Synchronization Solution," IP.COM, Inc., May 7, 2009, IPCOM000182833D, pp. 1-11.

(Continued)

*Primary Examiner* — Tuan A Pham
(74) *Attorney, Agent, or Firm* — Law Office of Jim Boice

(57) ABSTRACT

A system and/or computer program product synchronizes data between a first computer and a second computer. An original first data in a first computer is changed into revised first data in the first computer by inserting a data change into the original first data. The data change in the revised first data is identified and transmitted to a second computer in a message. The message instructs the second computer to convert an original second data stored in the second computer into a revised second data by inserting the data change into the original second data, where the original second data and the revised second data are used and managed by a resident application software on the second computer. The message is executable without use of the resident application software on the second computer, thus allowing changes to be made across disparate platforms.

16 Claims, 4 Drawing Sheets

(56) References Cited

U.S. PATENT DOCUMENTS

| | | | | |
|---|---|---|---|---|
| 2013/0102335 A1* | 4/2013 | Katagi | ............... | H04W 4/02 455/457 |
| 2014/0053227 A1* | 2/2014 | Ruppin et al. | ............... | 726/1 |

OTHER PUBLICATIONS

U.S. Appl. No. 13/787,255—Non-Final Office Action mailed Oct. 9, 2014.

* cited by examiner

SYNCHRONIZED DATA CHANGES

BACKGROUND

The present disclosure relates to the field of computing hardware, and specifically to computer hardware used in storing and updating data. Still more specifically, the present disclosure relates to synchronizing updated data between computer systems.

Computer systems utilize data as input and output from application programs. This data may be stored in multiple computer systems. If a change is made to data in one computer system, making a similar change to data in another computer system is referred to as data synchronization between computer systems.

SUMMARY

In one embodiment, a system and/or computer program product synchronizes data between a first computer and a second computer. An original first data in a first computer is changed into revised first data in the first computer by inserting a data change into the original first data. The data change in the revised first data is identified and transmitted to a second computer in a message. The message instructs the second computer to convert an original second data stored in the second computer into a revised second data by inserting the data change into the original second data, where the second computer has a resident application software that uses and manages the original second data and the revised second data. The message is executable without use of the resident application software on the second computer, thus allowing changes to be made across disparate platforms.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
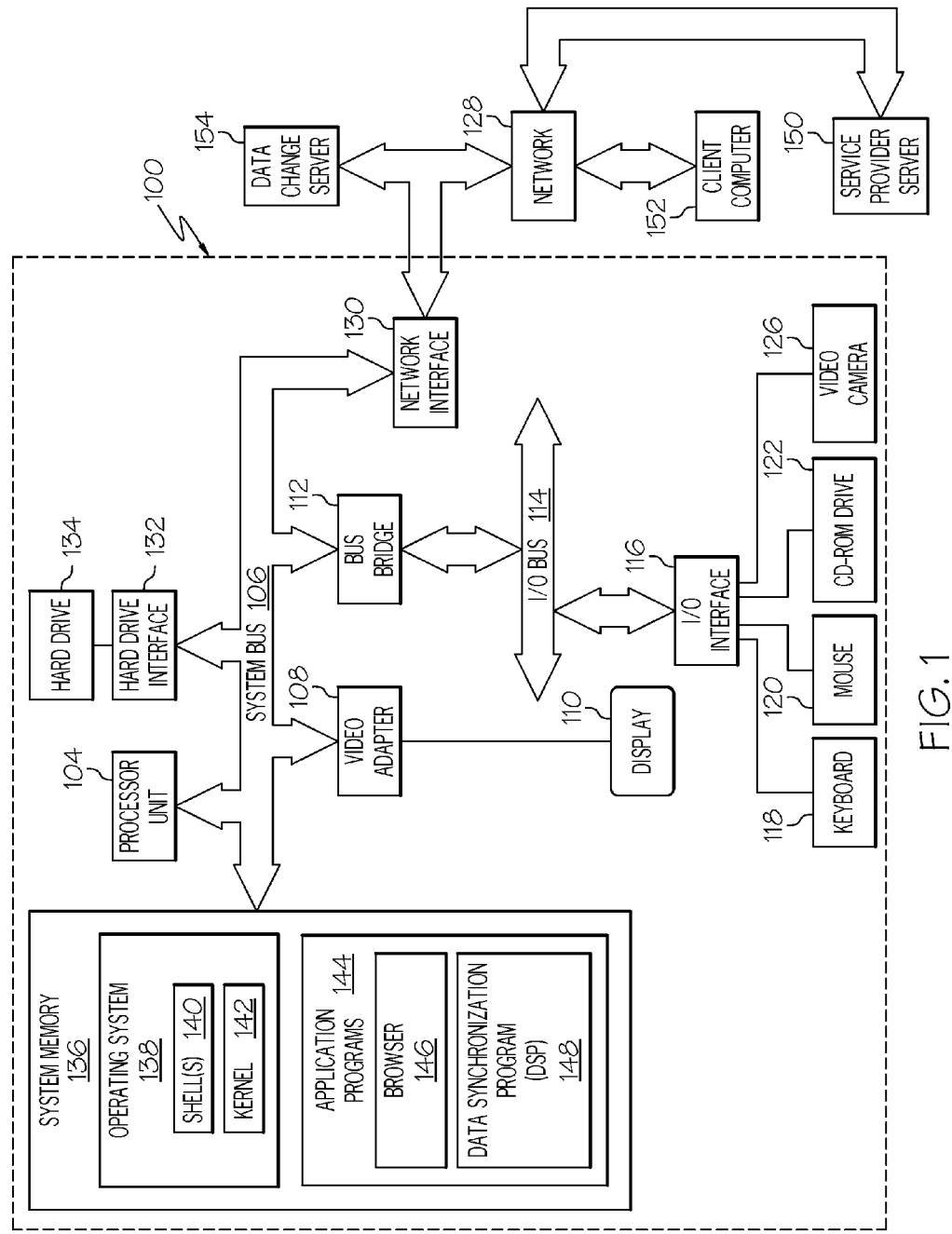
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and sensors 126. The format of the ports connected to I/O interface 116 may be any known to those skilled in the art of computer architecture, including but not limited to Universal Serial Bus (USB) ports.

Computer 100 is able to communicate with a service provider server 150, a client computer 152, and/or a data change server 154 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with service provider server 150. Application programs 144 in system memory 136 also include a data synchronization program (DSP) 148, which, in one embodiment, executes the process described below in FIGS. 2-3. In one embodiment, computer 100 is able to download DSP 148 from service provider server 150, preferably in an "on demand" basis.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 and/or client computer 152 and/or data change server 154 may be substantially similar to that shown for computer 100.

Note further that computer 100 may be any type of computing device, including, but not limited to, a smart phone, a personal digital assistant, a mobile or stationary monitoring device, etc.

Figure 2:
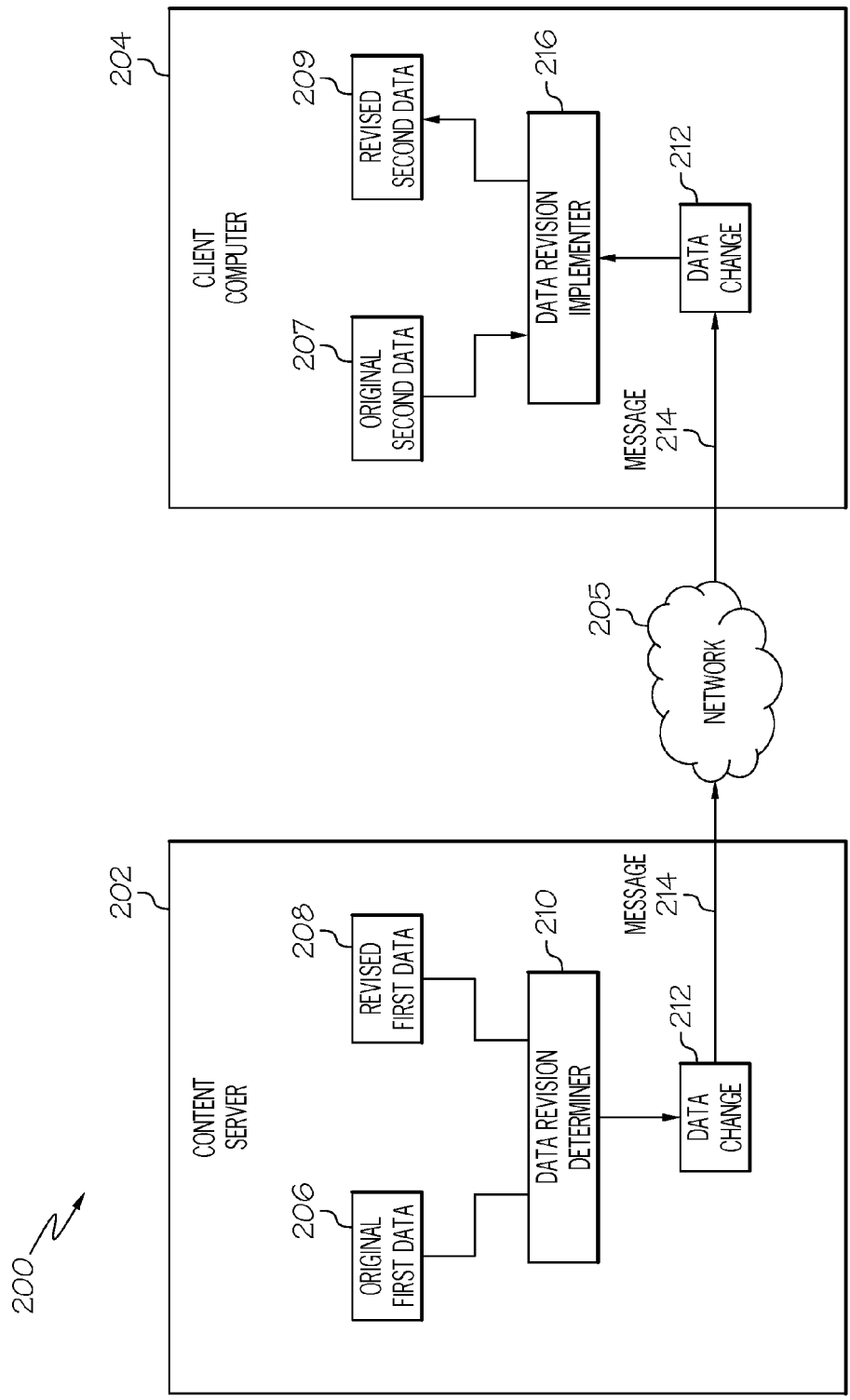
FIG. 2 illustrates an exemplary system having a content server and client computer in accordance with one embodiment of the present invention.

Referring now to FIG. 2, an exemplary system 200 for synchronizing data between two computers is presented. As depicted, a first computer (e.g., content server 202) communicates with a second computer (e.g., client computer 204) via a network 205 (which may be a peer-to-peer network, a hub-and-spoke network, etc.), analogous to the depiction of elements 100, 152, and 128 shown in FIG. 1. Stored within content server 202 is an original first data 206, which may be a set of text data, numerical data, audio data, video data, or any other type of data that is processable by a computer system. Using a process that may or may not be known to content server 202, original first data 206 is changed into a revised first data 208 by inserting and/or substituting a data change 212 into the original first data 206. For example, assume that original first data has five blocks of data, which are identified by their respective addresses as data blocks A1-A5. If data block A2 is replaced with a new data block A2', the result is revised first data 208, which is now made up of data blocks A1, A2', A3, A4 and A5.

In one embodiment, which data block was changed is unknown to content server 202. Thus, a data revision determiner 210 (which may be part of DSP 148 shown in FIG. 1) compares original first data 206 with revised first data 208 in order to identify the new data block A2', which is the data change 212. Data revision determiner 210 is also able to identify the location (i.e., address) at which the data change was made in the original first data 206.

Content server 202 (using DSP 148 shown in FIG. 1) then generates and transmits a message 214 to client computer 204. This message includes only the data change 212 and any minimal logic (e.g., an address header to identify the location of client computer 204 and instructions on where to insert the data change 212) needed to utilize the data change 212. The data change 212 is then utilized by a data revision implementer 216 to change an original second data 207 into a revised second data 209. Note the following features of the operations enabled in the client computer 204.

First, the data change 212 is directly installed into the original second data 207 without interfacing with any type of database software at the client computer 204. That is, the message 214 contains all necessary executable software (via whatever operating system is running on the client computer 204) for inserting the data change 212 directly into the original second data 207, thus creating the revised second data 209.

Second, the format/schema of the original first data 206 may be disparate from the format/schema of the original second data 207. For example, the original first data 206 may be a set of data that are executable by a first application program (i.e., a first word processing program), while the original second data may be a set of data that are executable by a second application program (i.e., a second type of word processing program). If these two data sets (elements 206/207) utilize different schema/formats/etc., then data revision implementer 216 converts the data change 212 into the appropriate format/schema before inserting the data change 212 into the original second data 207.

Third, the operating systems used by the content server 202 and the client computer 204 may be disparate. In this embodiment, the message 214 includes 1) the data change 212; and 2) instructions, which are executable under the operating system of the client computer 204, to locate the position within the original second data 207 at which the data change 212 is to be inserted.

Fourth, the present invention minimizes network bandwidth between the content server 202 and the client computer 204. That is, by accepting the premise that local disk and processor usage is cheap (in currency, time, performance) compared with network usage, changes to data are communicated by using local resources to determine what changes are made to an entire data file, and then transmitting only these changes, rather than the entire data file, to another computer for synchronization.

Thus, the present invention does not require the content server 202 and the client computer 204 to be running the same software (e.g., both running a same database program) or even the same operating system. Rather, in the present invention the data changes are made by directly accessing the data in the client computer 204. Thus, the message 214 sent to client computer 204 functions without interacting with any resident application software that is running on, and is managing, the original second data 207 and/or the revised second data 209 in the client computer 204. By directly accessing the original second data 207, through use of executable logic within the message 214, the data change 212 can be applied across multiple disparate platforms. For example, the original second data 207 may be data that is managed/processed/used by a word processing application, a database management application, a video processing application, etc., all of which are examples of resident application software that can be running on the client computer 204. However, the present invention is able to directly change the original second data 207, regardless of what type of application software is managing/processing/using data from the original second data 207. Thus, the original second data 207 and/or revised second data 209 and/or original first data 206 and/or revised first data 208 shown in FIG. 2 can be adjusted and managed using any type of resident application software (e.g., applications that manage, format, access, and otherwise use the data).

Note further that the data change 212, which is transmitted as part of the payload in the message 214, can be stored in a buffer, in a database, in a section of memory devoted to a particular application software (e.g., a database management application, a word processing application, a spreadsheet application, a graphics application, etc.), in the content server 202 and/or in the client computer 204.

Note that in one embodiment, the original first data 206, revised first data 208, original second data 207, and revised second data 209 are all encrypted data, and thus the data change 212 is also encrypted. That is, assume that original first data 206 incurs the data change 212. When the client computer 204 receives this data change 212 in the message 214, there is no need to first decrypt the data change 212 and the original second data 207, such that a decrypted version of data change 212 is inserted into the now-decrypted original second data 207. Rather, the encrypted data (i.e., the encrypted data change 212) is simply inserted directly into the encrypted original second data 207 to create an encrypted revised second data 209.

Figure 3:
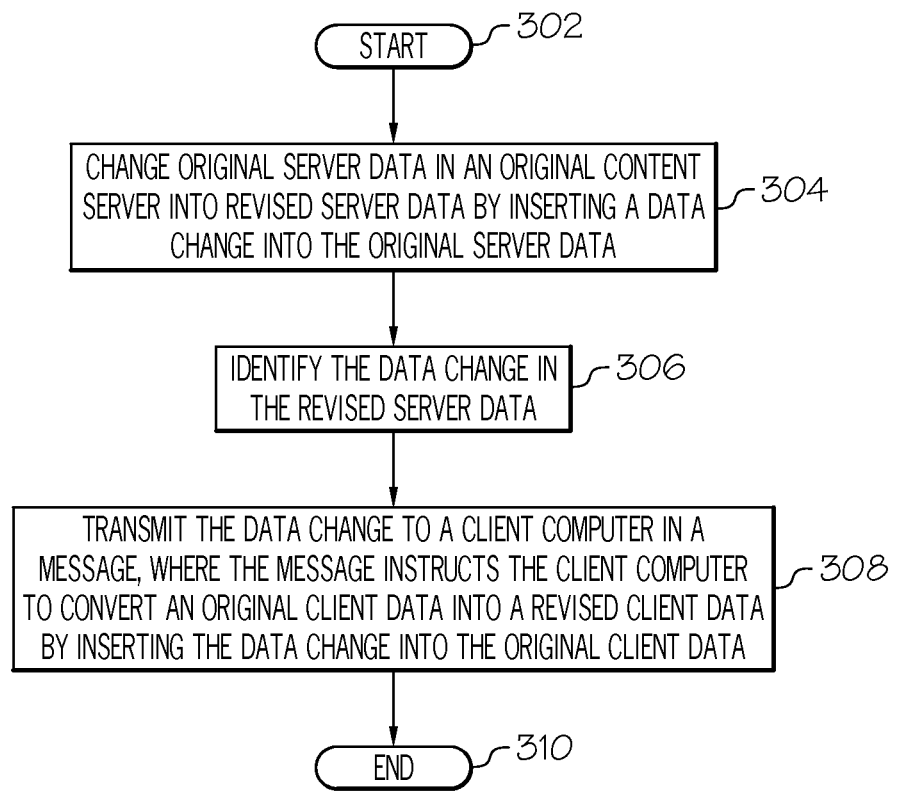
FIG. 3 is a high-level flow chart of one or more exemplary steps performed by one or more processors to minimize bandwidth usage when synchronizing data between two computers.

With reference now to FIG. 3, a high-level flow chart of one or more exemplary steps performed by one or more processors to minimize bandwidth usage when synchronizing data between two computers is presented. After initiator block 302, an original server data (i.e., original first data) in an original content server (i.e., a first computer) is changed, by one or more processors, into revised server data (i.e., revised first data) in the first computer by inserting a data change into the original server data, as described in block 304. In one embodiment, this data change is retrievable by the first computer from a data change server (e.g., data change server 154 shown in FIG. 1). In this embodiment, different logic within the first computer may be isolated from one another such that the first computer is unable to identify the data change. In this embodiment, then, a data revision determiner (e.g., element 210 shown in FIG. 2) will compare the original first data with the revised first data to identify 1) the data change and 2) the location within the original first data where the change to the data is made (block 306).

As described in block 308, one or more processors in the first computer then transmits the data change to a client computer (i.e., a second computer) in a message (e.g., element 214 in FIG. 2). This message instructs the second computer to convert an original client data (i.e., an original second data) stored in the second computer into a revised client data (i.e., a revised second data) by inserting the data change into the original second data. In one embodiment, the message is executable by disparate types of data revision software on the second computer. That is, regardless of what types of application and/or operating systems ("data revision software") are running on the second computer, the message contains enough information for the operating system on the client computer to execute the instructions in the message. This process is performed by 1) determining a data change location in the original first data at which the data change is inserted to create the revised first data; and 2) transmitting the data change location to the second computer in the message, where the second computer is enabled to calculate an equivalent data change location in the original second data. That is, the data revision implementer 216 is able to calculate an equivalent location in the original second data 207 at which the data change 212 was inserted in the original first data 206 in FIG. 2, regardless of what types of files are stored in the first and second computers.

For example, assume that original first data 206 is a text file, and that data change 212 is a text file, but original second data 207 is a video file. Nonetheless, the data change 212 can still be inserted into the video file as a text subroutine. The data revision determiner 210 is able to determine the context of the location in which the data change 212 was inserted. For example, assume that the data change was inserted between text that describes a first scene in a video game and a second scene in the video game. The data revision determiner 210 identifies this context, and generates a scene descriptor that a video program is able to interpret. The data revision implementer 216 is thus able to insert this text file (data change 212) into the video file (original second data 207), in order to create a revised second data 209 that is a hybrid text/video file.

Returning to FIG. 3, the process ends at terminator block 310.

Figure 4:
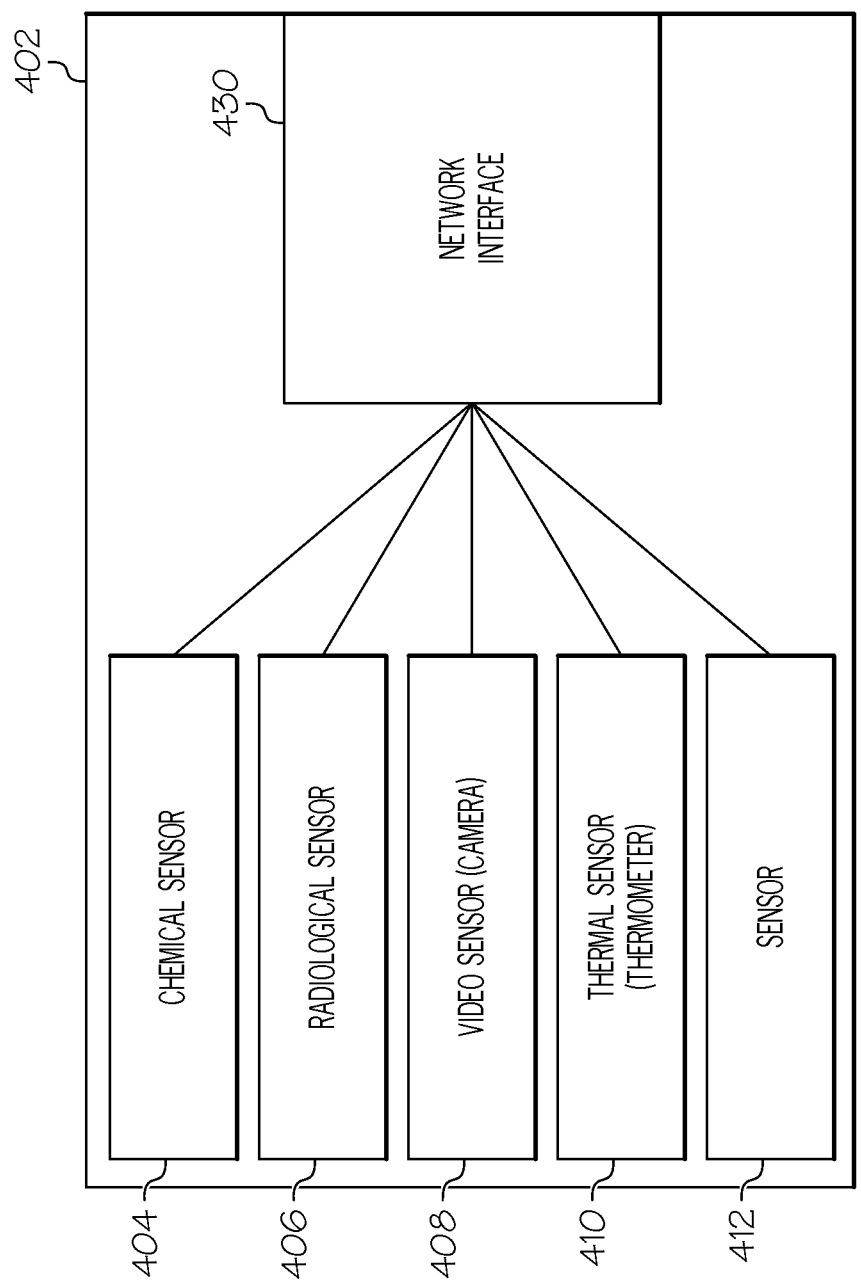
FIG. 4 depicts an exemplary multi-sensor content server.

With reference now to FIG. 4, an exemplary embodiment of the content server 202 shown in FIG. 2 is depicted as content server 402. As with the content server 202 shown in FIG. 2, content server 402 is able to communicate with other computers via a network interface 430 (analogous to the network interface 130 shown in FIG. 1). Note that the sensors 126 depicted in FIG. 1 are shown in greater detail in FIG. 4. That is, in one embodiment the sensors in the content server 402 are each dedicated to observing a different type of phenomenon. For example, chemical sensor 404 detects and identifies the presence of specific types of chemicals; radiological sensor 406 detects and quantifies nuclear radiation energy; video sensor 408 is a still/motion camera that monitors visual phenomena; thermal sensor 410 is a digital thermometer, etc. Other types of sensors (generically represented as sensor 412) include, but are not limited to, motion sensors, accelerometers, salinity sensors, pressure (e.g., atmospheric) sensors, wind speed and humidity sensors, etc.

Content server 402 may be part of any of multiple types of devices. Examples of such devices include, but are not limited to, airborne devices (manned and unmanned airborne vehicles), balloons, space satellites, extraterrestrial rovers, ocean-based buoys, etc. In this embodiment, each of the sensors depicted in FIG. 4 can independently generate the data change 212 depicted in FIG. 2.

For example, assume that content server 402 is an airborne high-altitude observation vehicle, and that all of the sensors in FIG. 4 are detecting no change in their observations except for radiological sensor 406. In this case, radiological sensor 406 will autonomously generate a data change 212 and send it to another computer via the network interface 430. Thus, only the changed readings from radiological sensor 406 will make up the data change 212.

In another exemplary embodiment, assume that content server 402 is a remote rover on an extraterrestrial body (i.e., a planet other than Earth). Assume also that the video sensor 408 is generating a local video record (i.e., original first data 206 shown in FIG. 2), regardless of whether the remote rover is moving or not or whether there is any other change in the scenery. However, assume now that a moving object (e.g., an asteroid) strikes within the field of view of the video sensor 408. There is now a data change in what the video sensor 408 is detecting (i.e., the movement of the striking asteroid). In this scenario, only the image of the striking asteroid is transmitted back to Earth, since local logic (e.g., by executing instructions from DSP 148 shown in FIG. 1) will filter out the background scenery and transmit only the moving asteroid as the data change 212.

Note further that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer program product for synchronizing data between a first computer and a second computer, the computer program product comprising:
   one or more computer-readable storage devices and program instructions stored on at least one of the one or more non-transitory computer-readable storage devices, the program instructions comprising:
   program instructions to change an original first data in a first computer into a revised first data in the first computer by inserting a data change into the original first data, wherein different logic within the first computer are isolated from one another such that the first computer is unable to identify the data change, wherein the first computer comprises a video sensor that generates a local video record of an environment of the first computer, wherein the data change is a result of a change to the local video record caused by a moving physical object that alters an appearance of the environment of the first computer;
   program instructions to identify the data change in the revised first data;
   program instructions to receive, by the first computer, an identification of the data change from a data change server, wherein the data change occurred within the first computer without the first computer being able to identify the data change;
   program instructions to transmit the data change to a second computer in a message, wherein the message instructs the second computer to convert an original second data stored in the second computer into a revised second data by inserting the data change into the original second data, wherein the original first data is a text file, wherein the original second data is a video file, wherein the text file describes images in the video file, wherein the original second data and the revised second data are utilized by a resident application software on the second computer, wherein the message contains all necessary executable software that, when executed via an operating system running on the second computer, causes an insertion of the data change into the original second data, and wherein the message is executable without use of the resident application software on the second computer;
   program instructions to determine a data change location in the original first data at which the data change is inserted to create the revised first data;
   program instructions to identify a first location in the text file that corresponds to a second location in the video file based on related content from the text file and the video file; and
   program instructions to transmit the data change location to the second computer in the message, wherein the second computer is enabled to calculate an equivalent data change location in the original second data, and wherein the data change is inserted into the video file to create a hybrid text/video file that includes a text data change and the video file;
   program instructions to receive, from the video sensor, the change to the local video record caused by the moving physical object;
   program instructions to filter out an image of a background of the environment of the first computer that does not include an image of the moving physical object; and
   program instructions to transmit, in response to detecting a physical event, only the data change showing the image of the moving physical object without the image of the background of the environment of the first computer.

2. The computer program product of claim 1, wherein the message contains the data change without any other data from the revised first data.

3. The computer program product of claim 1, wherein the data change is identified within the first computer by comparing the original first data to the revised first data.

4. The computer program product of claim 1, wherein the first computer is a content server and the second computer is a client computer.

5. The computer program product of claim 1, wherein the original first data and the original second data utilize disparate types of schemas.

6. The computer program product of claim 1, wherein the first computer and the second computer utilize disparate types of operating systems.

7. The computer program product of claim 1, wherein the data change is generated by a specific sensor from a multi-sensor content server, wherein the specific sensor is dedicated to monitoring a particular type of observable phenomenon, wherein the particular type of observable phenomenon is different from other types of phenomena that are observed by other sensors in the multi-sensor content server, wherein the specific sensor is from a group of sensors consisting of a chemical sensor, a radiological sensor, a video sensor, a thermal sensor, and a salinity sensor, and wherein the data change describes only changes made to the particular type of observable phenomenon that is observed by the specific sensor.

8. The computer program product of claim 1, wherein the original first data and the original second data contain output data from one or more sensors that detect environmental states of an environment of the first computer, and wherein the computer program product further comprises program instructions, stored on at least one of the one or more computer-readable storage devices, to:
   receive, from the one or more sensors, data describing a change to the environmental states of the environment of the first computer; and
   incorporate the data describing the change to the environmental states of the environment of the first computer into the original second data to generate the revised second data.

9. The computer program product of claim 1, further comprising program instructions, stored on at least one of the one or more computer-readable storage devices, to:
   store the data change in a buffer, in the first computer, that is devoted to a particular application software.

10. A computer system for synchronizing data between a first computer and a second computer, the computer system comprising:

one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:

first program instructions to change an original first data in a first computer into a revised first data in the first computer by inserting a data change into the original first data, wherein different logic within the first computer are isolated from one another such that the first computer is unable to identify the data change, wherein the first computer comprises a video sensor that generates a local video record of an environment of the first computer, wherein the data change is a result of a change to the local video record caused by a moving physical object that alters an appearance of the environment of the first computer;

second program instructions to identify the data change in the revised first data;

third program instructions to receive, by the first computer, an identification of the data change from a data change server, wherein the data change occurred within the first computer without the first computer being able to identify the data change;

fourth program instructions to transmit the data change to a second computer in a message, wherein the message instructs the second computer to convert an original second data stored in the second computer into a revised second data by inserting the data change into the original second data, wherein the original first data is a text file, wherein the original second data is a video file, wherein the text file describes images in the video file, wherein the original second data and the revised second data are utilized by a resident application software on the second computer, wherein the message contains all necessary executable software that, when executed via an operating system running on the second computer, causes an insertion of the data change into the original second data, and wherein the message is executable without use of the resident application software on the second computer;

fifth program instructions to determine a data change location in the original first data at which the data change is inserted to create the revised first data;

sixth program instructions to identify a first location in the text file that corresponds to a second location in the video file based on related content from the text file and the video file; and seventh program instructions to transmit the data change location to the second computer in the message, wherein the second computer is enabled to calculate an equivalent data change location in the original second data, and wherein the data change is inserted into the video file to create a hybrid text/video file that includes a text data change and the video file;

eighth program instructions to receive, from the video sensor, the change to the local video record caused by the moving physical object;

ninth program instructions to filter out an image of a background of the environment of the first computer that does not include an image of the moving physical object; and tenth program instructions to transmit, in response to detecting a physical event, only the data change showing the image of the moving physical object without the image of the background of the environment of the first computer.

11. The computer system of claim 10, wherein the message contains the data change without any other data from the revised first data.

12. The computer system of claim 10, wherein the data change is identified within the first computer by comparing the original first data to the revised first data.

13. The computer system of claim 10, wherein the first computer is a content server and the second computer is a client computer.

14. The computer system of claim 10, wherein the data change is retrieved by the first computer from a data change server.

15. The computer system of claim 10, wherein the original first data and the original second data utilize disparate types of schemas.

16. The computer system of claim 10, wherein the first computer and the second computer utilize disparate types of operating systems.

* * * * *